US012518958B2

(12) United States Patent
Hauschild et al.

(10) Patent No.: US 12,518,958 B2
(45) Date of Patent: Jan. 6, 2026

(54) ION TRAP WITH ELONGATED ELECTRODES

(71) Applicant: Thermo Fisher Scientific (Bremen) GmbH, Bremen (DE)

(72) Inventors: Jan-Peter Hauschild, Weyhe (DE); Alexander A. Makarov, Bremen (DE); Alexander Kholomeev, Bremen (DE); Dmitry Grinfeld, Bremen (DE); Eduard V. Denisov, Bremen (DE); Amelia Corinne Peterson, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 376 days.

(21) Appl. No.: 18/112,138

(22) Filed: Feb. 21, 2023

(65) Prior Publication Data

US 2024/0331996 A1 Oct. 3, 2024

Related U.S. Application Data

(62) Division of application No. 16/878,722, filed on May 20, 2020, now abandoned.

(30) Foreign Application Priority Data

May 22, 2019 (GB) ...................................... 1907235

(51) Int. Cl.
*H01J 49/42* (2006.01)
*H01J 49/06* (2006.01)

(52) U.S. Cl.
CPC ........ *H01J 49/4225* (2013.01); *H01J 49/067* (2013.01); *H01J 49/427* (2013.01)

(58) Field of Classification Search
CPC ...... H01J 49/067; H01J 49/022; H01J 49/165; H01J 49/4225; H01J 49/427; H01J 49/423
See application file for complete search history.

(56) References Cited

U.S. PATENT DOCUMENTS

| | | | | |
|---|---|---|---|---|
| 4,736,101 A * | 4/1988 | Syka | H01J 49/0081 | 250/282 |
| 5,354,988 A * | 10/1994 | Jullien | H01J 49/4215 | 250/282 |
| 2008/0048112 A1* | 2/2008 | Makarov | H01J 49/427 | 250/290 |

FOREIGN PATENT DOCUMENTS

| | | | |
|---|---|---|---|
| WO | WO-2017022125 A1 * | 2/2017 | H01J 49/004 |

* cited by examiner

*Primary Examiner* — David E Smith
(74) *Attorney, Agent, or Firm* — ALG Intellectual Property, LLC

(57) ABSTRACT

An ion trap 1 comprises one ejection electrode 2 for ion trapping having an opening 4, through which ions in the ion trap 1 can be ejected in an ejection direction E and further electrodes 3 for ion trapping, wherein the ejection electrode 2 and the further electrodes 3 are elongated in a longitudinal direction L. The angle α between the longitudinal direction L and the ejection direction E is nearly 90°. The ion trap 1 comprises a primary winding 5 connected to an RF power supply 6, a secondary winding 7 coupling with the primary winding 5 for transforming the RF voltage of the RF power supply 6 supplying the transformed RF signals to the ejection electrode 2 and secondary windings 7' coupling with the primary winding 5 for transforming the RF voltage of the RF power supply 6 supplying the transformed RF signals to the further electrodes 3.

15 Claims, 7 Drawing Sheets

--Prior Art--

--Prior Art--

--Prior Art--

--Prior Art--

ION TRAP WITH ELONGATED ELECTRODES

PRIORITY

This application claims priority to UK Patent Application 1907235.4, filed on May 22, 2019, and titled "Ion Trap with Elongated Electrodes," by Jan Peter Hauschild et al, which is hereby incorporated herein by reference in its entirety. This application is further a divisional of U.S. patent application Ser. No. 16/878,722, filed on May 20, 2020, and titled "Ion Trap with Elongated Electrodes," by Jan Peter Hauschild et al.

TECHNICAL FIELD OF THE INVENTION

This invention relates to an ion trap and to a method of ejecting ions from an ion trap, wherein the ions are ejected in an ejection direction E which is perpendicular or substantially perpendicular to the longitudinal direction L of the ion trap.

BACKGROUND OF THE INVENTION

Ion traps could be used in order to provide a buffer for the incoming stream of ions and to prepare a packet with spatial, angular and temporal characteristics adequate for the specific mass analyser. Examples of pulsed mass analysers include time-of-flight (TOF), Fourier transform ion cyclotron resonance (FT ICR), Orbitrap® types (i.e. those using electrostatic only trapping), or a further ion trap.

Ion traps are storage devices that use RF fields for transporting or storing ions. Typically, they include a RF signal generator that provides a RF signal to the primary winding of a transformer. A secondary winding of the transformer is connected to the electrodes (typically four) of the storage device. Typically they comprise elongate electrodes extended in a longitudinal direction L and the electrodes are paired along axes perpendicular to the longitudinal direction. In a ion trap having e.g. 4 electrodes the electrodes are shaped to create a quadrupolar RF field with hyperbolic equi-potentials that contain ions entering or created in the ion trap. Trapping within the ion trap can be assisted by the use of a DC field. As can be seen from FIG. 2*a*, each of the four elongate electrodes is split into three along the z axis. Elevated DC voltages can be applied to the front and back sections of each electrode relative to the larger central section, thereby superimposing a potential well on the trapping field of the ion trap that results from the superposition of RF and DC field components. RF voltages may also be applied to the electrodes to create an RF field component that assists in ion selection.

In particular there are two types of ion traps having elongated electrodes: Linear ion traps comprise straight linear electrodes. Curved linear ion traps called C-trap comprise curved electrodes. An ion trap can have various number of of electrodes. In particular an ion trap has pairs of electrodes. Preferably on ion trap has 4 electrodes (quadrupole ion trap), 6 or 8 electrodes.

This invention is now to related to such ion traps, which are ejected ions which are trapped in the ion trap in an ejection direction E which is perpendicular or substantially perpendicular to the longitudinal direction L of the ion trap. Therefore the ion trap comprises one electrode, an ejection electrode, which has an opening in the ejection direction E. Preferably the opening is positioned in the middle of the ejection electrode or at least close to the middle of the electrode. The opening is in particular positioned in the middle of the ejection electrode in its longitudinal direction L or at least close to the middle of the ejection electrode in its longitudinal direction L.

To eject ions from the ion trap in the ejection direction E different approaches are known to apply a DC voltages to the electrodes, preferably after the RF voltage trapping the ions in the ion trap has been switched off or at least reduced.

Chien et al. are proposing in "*Enhancement of resolution in Matrix-assisted Laser Desorption Using an Ion-trap Storage/Reflectron Time-of-flight Mass Spectrometer*", Rapid. Comm. Mass Spectrom. Vol. 7, 837-844 (1993) to apply to an electrode, through which the ions are leaving the ion trap a DC voltage which is pulling the ions to the this ejection electrode. On the other hand Fountain et al. "*Mass-selective Analysis of Ions in Time-of-flight Mass spectrometry Using an Ion-trap Storage Device*", Rapid. Comm. Mass Spectrom. Vol. 8, 487-494 (1994) to apply to electrode, which is opposite of the electrode, through which the ions are leaving the ion trap a DC voltage which is pushing the ions to the electrode, through which the ions are leaving the ion trap.

In U.S. Pat. No. 5,569,917 is disclosed to apply at the same time to apply to an electrode, through which the ions are leaving the ion trap a DC voltage which is pulling the ions to the this ejection electrode and to the electrode, which is opposite of this electrode, a DC voltage of opposite polarity which is pushing the ions to the electrode, through which the ions are leaving the ion trap.

A similar approach is also described in US 2011/0315873 A1 for an ion trap having elongated electrodes. The details, how to apply DC voltages to the electrodes to eject ions from the ion trap, are illustrated below. Also in this approach voltage difference is applied to the ejection electrodes and the electrode opposite of the ejection electrode. This approach requires a specific DC voltage supply for these two electrodes.

The efficiency of the ejection of the ions from ion trap using this approaches is limited. Not all ions stored in the ion trap can be extracted and transferred e.g. by the acceleration lens to a mass analyser. In particular the efficiency depends on the occurrence of space charges in an ion trap and the mass distribution of the stored ion population.

Further a lot of ions pushed to the ejection electrode get lost because they hit the edge of the opening of the ejection electrode. This results in an increased contamination of the edge which might further influence the behaviour of the ion trap, in particular during ion ejection.

Due to the mentioned problems further the dynamic range and linearity of mass analysers to which the ejected ions are transferred, is limited.

Another disadvantage of the known approaches to eject ions from ion traps is that to each electrode of a the ion trap a specific DC voltage has to be applied which is requiring a lot of DC supply devices and a detailed control of the application of different DC voltages to each DC electrode. It is an object of the invention to provide an improved ion trap having a higher efficiency of ion ejection.

It is an object of the invention to provide an improved ion trap, wherein the dependence of the efficiency of ion ejection on space charge is reduced.

It is an object of the invention to provide an improved ion trap, wherein the dependence of the efficiency of ion ejection on the mass distribution within the stored ion population is reduced.

It is an object of the invention to provide an improved ion trap, wherein during the ion ejection the contamination of the opening, through which the ions are ejected is reduced in comparison to ion traps of the prior art.

It is an object of the invention to provide an improved ion trap, by which the dynamic range of a mass analyser can increased, to which the ion trap is supplying the ejected ions.

It is an object of the invention to provide an improved ion trap, by which the linearity of a mass analyser can increased, to which the ion trap is supplying the ejected ions.

Another object of the invention is to provide an improved ion trap with a simplified voltage supply.

SUMMARY OF THE INVENTION

At least one and preferably all of the objects are solved by an ion trap of claim 1.

The inventive ion trap comprises for ion trapping one ejection electrode and further electrodes. The ejection electrode and the further electrodes are elongated in a longitudinal direction L. The ion trap may be a straight linear ion trap or a curved linear ion trap (C-trap). Also the ion trap might comprise electrodes with linear and curved portions. The ion trap may be a linear quadrupole ion trap, i.e. having four elongate electrodes. However, the invention may be applied in ion traps having more than four electrodes (e.g. six or eight electrodes). The electrodes of the ion trap, the ejection electrode and further electrodes, have preferably the same shape along the longitudinal direction L of the ion trap. So the longitudinal direction can be (the same direction along the whole ion trap) a straight line or a curved line or a partially straight and curved line.

In a specific embodiment, different electrodes of the ion trap can be used as ejection electrode at different instants of time.

The ejection electrode of the ion trap has an opening, through which ions in the ion trap 1 can be ejected in an ejection direction E. The ejection direction E of a package of ejected ions is defined as the average direction in which the ions of the package fly when leaving the opening of the ejection electrode. So for an ejected package of ions the ejection direction is typically defining the direction of the central ion beam of the ion package. The width of the ion beam perpendicular to the ejection direction E might still depend on experimental conditions. The ejection direction E of the ejected ions is at least nearly perpendicular to the longitudinal direction L of the electrodes. The angle α between the longitudinal direction L and the ejection direction E deviates from 90° typically not more than 15°, preferably not more than 10° and particularly preferably not more than 5°.

For the ion trapping in the ion trap the electrodes of the ion trap, the ejection electrode and the further electrodes, are supplied with a RF voltage. Some or all electrodes may be during ion trapping also supplied with a DC voltage e.g. to create potential walls.

The RF voltage applied to the electrodes is generated by transforming the RF voltage provided by a RF power supply. This RF power supply is providing the generated RF signal to a primary winding. Then is primary winding is inductively coupled with a secondary winding. The RF signal generated by transformation in this winding is then supplied to the ejection electrode. Further the primary winding is also inductively coupled with other secondary windings. The signal generated by transformation in these other windings is then supplied to the other electrodes of the ion trap.

The power supply of the ion trap is controlled by a controller, which may comprise various control means, for example: a processor, switches, and/or software to be executed by the processor and other software and hardware components.

With the RF voltages applied to the electrodes, the ions can be trapped in the ion trap. Optionally, the trapped ions are cooled or thermalised in the ion trap prior to ejection. For the ejection of the ions from the ion trap according to the invention also DC voltages have to be applied to the electrodes of the ion trap. Typically, they are applied, after the RF voltage provided to the electrodes has been switched off. The the iventive ion trap is comprising at least two DC supplies, providing DC voltages to the electrodes of the ion trap. The application of the DC voltages is controlled by the control of the ion trap.

For ejection of ions from the ion trap, a first DC voltage provided by first DC supply is applied to the ejection electrode. The first DC voltage is provided to the ejection electrode via the secondary winding, which is also supplying the RF signal to the ejection electrode. The first DC voltage is applied to the ejection electrode to pull the ions in the ion trap to the opening of the ejection electrode.

A second DC voltage is provided by second DC supply. The second DC voltage is provided to at least 70% of the further electrodes via the secondary windings which are also supplying the RF signal to the further electrodes. The second DC voltage pushes ions in the ion trap to the opening of the ejection electrode. Therefore, the DC voltage provided by second DC supply to the at least 70% of the further electrodes has the same polarity as most ions in the ion trap.

Preferably the number of further electrodes is 3, so that the ion trap is a quadrupole. But the number of the further electrodes could be also in other embodiments 5 (heaxpole) or 7 (octopole).

In a preferred embodiment the ion trap comprises curved electrodes. In particular the inventive ion trap can be a curved ion trap.

In preferred embodiments of the inventive ion trap the angle α between the longitudinal direction L and the ejection direction E deviates from 90° not more than 7°, preferably not more than 3°.

In other preferred embodiment of the inventive ion trap the controller is applying in the time period the second DC voltage provided by the second DC supply via the secondary windings to the at least 80% of the further electrodes to push ions in the ion trap to the opening of the ejection electrode. In a more preferred embodiment of the inventive ion trap the controller is applying in the time period the second DC voltage provided by the second DC supply via the secondary windings to all further electrodes 3 to push ions in the ion trap to the opening of the ejection electrode.

The time period in which the controller is applying the first DC voltage to the ejection electrode and second DC voltage to the further electrodes, can be between 5 ms and 5000 ms, preferably between 10 ms and 2000 ms and particular preferably between 50 ms and 500 ms. In particular both DC voltages can be applied at the same time, but there might be a delay up to 5000 ns, preferably up 500 ns and in particular preferably up to 100 ns. Preferably the second voltage is at first applied to the further electrodes.

Typically, is voltage difference between the first DC voltage applied to the ejection electrode 2 and the second DC voltage applied to the further electrodes 3 between 50 V and 800 V, preferably between 100 V and 600 V and particular preferably between 200 V and 400 V.

The inventive ion trap comprises in a preferred embodiment a focusing lens, which is arranged for the ejected ions downstream of the of the opening of the ejection electrode and is focusing the ejected ions. Preferably the focusing lens has an opening into which the ejected ions are directed which is larger than the opening of the ejection electrode. The focusing lens 10 may be an electrostatic lens to which a DC voltage is applied. Typically is the voltage difference between the DC voltage of the focusing lens and the first DC voltage of the ejection electrode is between 250 V and 1,500 V, preferably between 400 V and 1,000 V and particular preferably between 600 V and 800 V. Typically the ratio of the voltage difference between the DC voltage of the focusing lens and the first DC voltage of the ejection electrode and the voltage difference between the first DC voltage applied to the ejection electrode and the second DC voltage applied to the further electrodes 3 is between 1.5 and 6, preferably between 2.0 and 4 and particular preferably between 2.2 and 3.

The inventive ion trap comprises in a preferred embodiment an acceleration lens, which is arranged for the ejected ions downstream of the focusing lens. The acceleration lens 12 has preferably an opening 13 into which the ejected ions are directed which is smaller than the opening of focusing lens. the acceleration lens 12 Preferably is the acceleration lens an electrostatic lens to which a DC voltage is applied. Typically the voltage difference between the DC voltage of the acceleration lens and the DC voltage of the focusing lens is between 800 V and 5,000 V, preferably between 1,500 V and 3,500 V and particular preferably between 2,000 V and 2,700 V. Typically is the ratio of the voltage difference between the voltage difference between the DC voltage of the acceleration lens and the first DC voltage of the ejection electrode and the voltage difference between the first DC voltage applied to the ejection electrode and the second DC voltage applied to the further electrodes between 2 and 12, preferably between 4 and 9 and particular preferably between 5 and 7. Typically is the ratio of the voltage difference between the first DC voltage applied to the ejection electrode and the second DC voltage applied to the further electrodes and the voltage difference between the voltage difference between the DC voltage of the acceleration lens and the second DC voltage applied to the further electrodes and is between 0.05 and 0.4, preferably between 0.1 and 0.25 and particular preferably between 0.12 and 0.2.

In a preferred embodiment of the ion trap the secondary winding supplying the transformed RF voltage to the ejection electrode and the secondary winding supplying the transformed RF voltage to one of the further electrodes are a pair of secondary windings connected in series.

In a preferred embodiment of the ion trap the secondary windings supplying the transformed RF voltage to two of the further electrodes 3 are a pair of secondary windings connected in series.

In preferred embodiment of the inventive ion trap further components of a mass spectrometer, in particular a HCD cell or a transport multipole, are supplied with a RF voltage, by tapping RF voltages from the RF supply of the ejection electrode 2 and further electrodes 3 of the ion trap. Preferably an inductance divider is used for tapping the RF voltage.

At least one and preferably all of the objects are solved by a method of electing ions from an ion trap as described herein.

The ion trap comprises one ejection electrode and further electrodes elongated in a longitudinal direction L for ion trapping, wherein the ejection electrode comprises an opening, through which ions in the ion trap can be ejected in an ejection direction E, wherein an angle α between the longitudinal direction L and the ejection direction E deviates from 90° not more than 15°, wherein RF voltage is supplied to the ion trap by a primary winding connected to an RF power supply, a secondary winding coupling with the primary winding transforming the RF voltage of the RF power supply 6 and supplying the transformed RF voltages to the ejection electrode and secondary windings coupling with the primary winding transforming the RF voltage of the RF power supply and supplying the transformed RF voltages to the further electrodes, a first DC supply 8 and a second DC supply 9.

The methods comprises the first step of switching off the RF voltage supplied to the one ejection electrode and the further electrodes of the ion trap and then in a second step applying in a time period a first DC voltage via secondary winding provided by the first DC supply to the ejection electrode to pull ions in the ion trap to the opening of the ejection electrode and a second DC voltage provided by the second DC supply via the secondary windings to the at least 70% of the further electrodes to push ions in the ion trap to the opening 4 of the ejection electrode.

Further details of the inventive method can be derived from this specification.

DETAILED DESCRIPTION OF PREFERRED EMBODIMENTS

Figure 1:
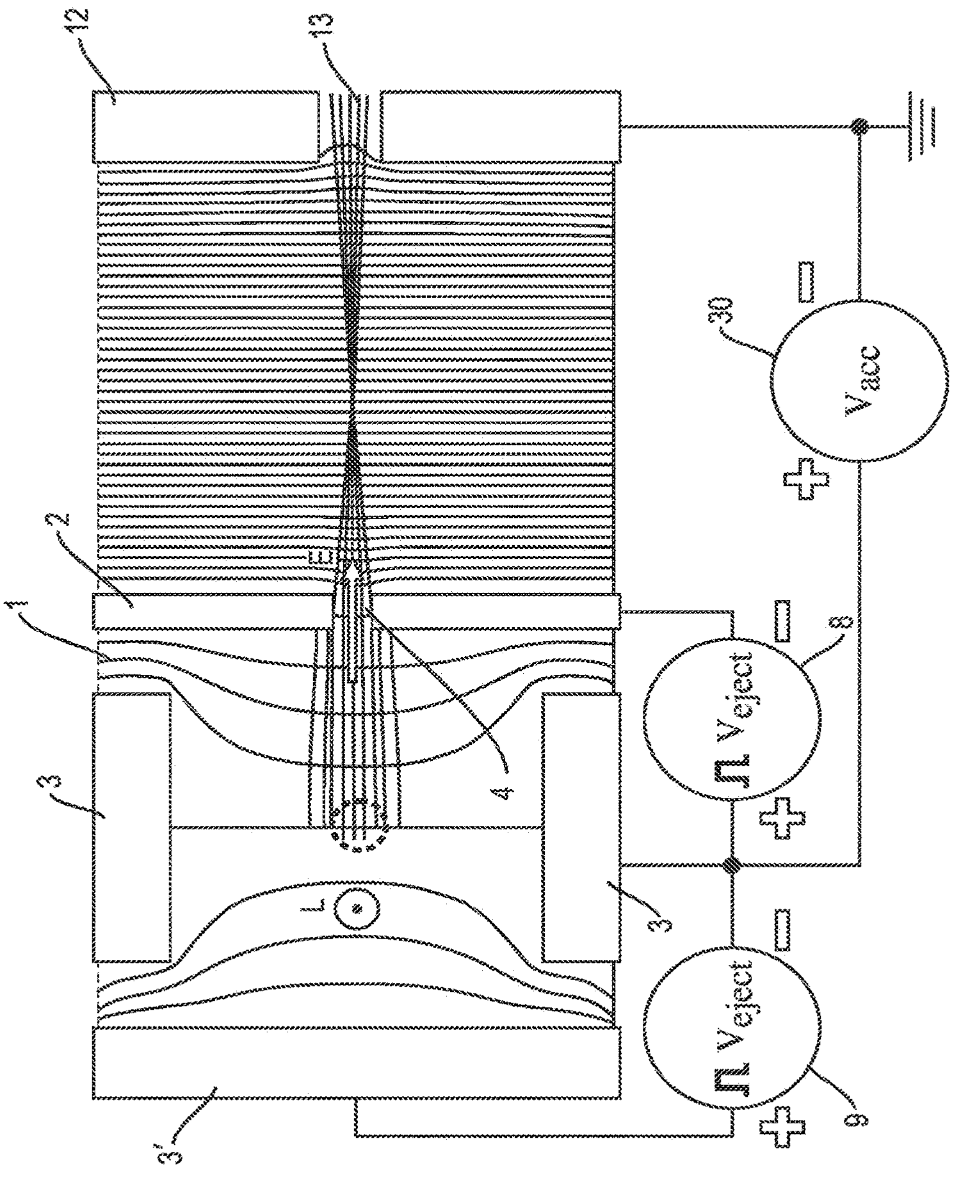
FIG. 1 shows the ejection of ions from an ion trap according to the prior art.

FIG. 1 shows the ejection of ions from an ion trap according to the prior art having elongated electrodes in the longitudinal direction L. A cross section of the ion trap perpendicular to the longitudinal direction L is shown. The ion trap is comprising an elongate ejection electrode 2 and three further elongate electrodes 3. The ejection electrode 2 has an opening 4 through which ions stored in the ion trap 1 can be ejected in an ejection direction E. In this drawing further is shown the DC voltage supply to the electrodes of the ion trap when ions shall be ejected. The ejected ions are accelerated from the opening 4 of the ion trap to an acceleration lens 12 having an opening 13. At least an RF voltage is applied to the four electrodes 2,3 of the ion trap, when ions are trapped. It is further possible to apply a small DC voltage to at least one of the electrodes 2,3 of the ion trap to improve the trapping by potential wells. Axial trapping is enabled by applying DC voltages to the end apertures of the trap (not shown).

When the trapped ions are to be ejected, the RF voltage and if present also the small DC voltage is switched off.

Then an offset voltage $V_{acc}$ is applied via an offset DC source which is positioned between the lower further electrode 3 and the acceleration lens 12, which is grounded. The same offset voltage $V_{acc}$ (now shown) is also supplied to the upper further electrode 3. A typical value for the applied offset voltage is 2,200 V. Via a first DC supply 8 a first DC voltage $V_{eject}$ is applied to ejection electrode 2. This first DC voltage $V_{eject}$ is applied between the lower further electrode 3 and the ejection electrode 2 by the first DC supply 8. A typical value for the first DC voltage $V_{eject}$ is 300V, wherein the negative polarity is applied to the ejection electrode 2. Due to the ejection electrode 2 also being connected to the offset DC source that supplies voltage $V_{acc}$, relative to ground a voltage of 1,900 V is applied to the ejection electrode 2. Via a second DC supply 9 a second DC voltage is applied to left further electrode 3, which is arranged opposite to the ejection electrode 2 in the ion trap. In the shown example second DC voltage has the same value $V_{eject}$ as the first DC voltage. This second DC voltage is applied between the lower further electrode 3 and the left further electrode 3' by the first DC supply 9. Then the value of the second DC voltage is also 300V, wherein the positive polarity is applied to the left further electrode 3'. Due to the ejection electrode 2 also being connected to the offset DC source that supplies voltage $V_{acc}$, relative to ground a voltage of 2,500 V is applied to the left further electrode 3. When these voltages are applied to the electrodes 2,3 of the Ion trap, positively charged ions are pushed by the voltage applied to the left further electrode 3 in the direction of the ejection electrode 2 and pulled by the voltage applied to the ejection electrode 2 to the ejection electrode 2. This effect on the positively charged ions is created by the electric field in the ion trap, which is provided by the voltage difference between the left further electrode 3 and the ejection electrode 2. This electric field has in particular a component directed to the ejection electrode 2 and as shown by the ion beam 32 of the ions in the ion trap is directed to the opening 4 of the ejection electrode 2. But not all ions are ejected through the opening and are further accelerated by the acceleration lens 12. A portion of ions strike the edge of the opening 4. This leads to a reduced efficiency of the ion ejection and to a contamination of the ejection electrode 2 at the edge of its opening. Further, a small dotted circle shows the central region from which ions are ejected from the ion trap 1, when the DC voltages are applied as described before.

Figure 2:
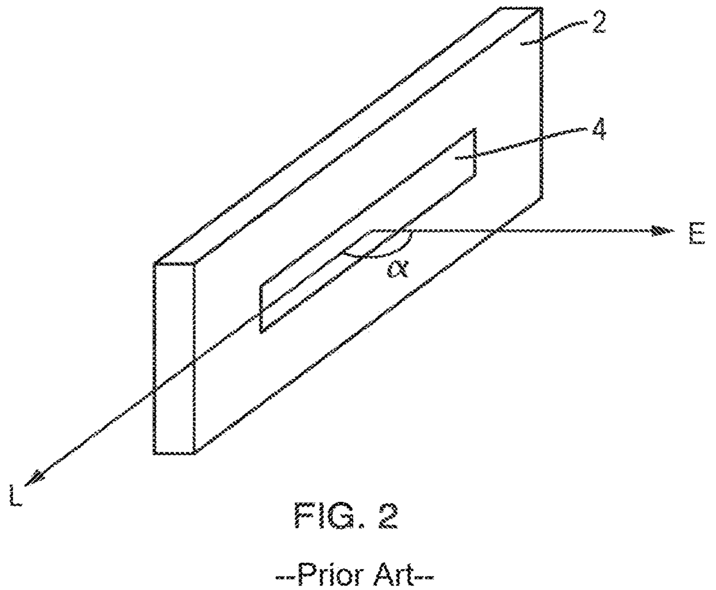
FIG. 2 shows the ejection electrode of an ion trap with elongated electrodes.

FIG. 2 shows the ejection electrode 2 of an ion trap with elongated electrodes. The ejection electrode in elongated in the longitudinal direction L. Also shown is opening 4 provided in the ejection electrode. Through this aperture 4 ions trapped in the ion trap 1 can be ejected by applying the DC voltages to the ejection electrode 2 and also further electrodes 3 of the ion trap 1. It is shown that the ions are ejected from the ion through the opening 4 into an ejection direction E. It is shown, that the ejection direction E of the ejected ions is substantially perpendicular to the longitudinal direction L of the electrodes. In general, the ejection direction E of the ejected ions is at least nearly perpendicular to the longitudinal direction L of the electrodes. The angle α between the longitudinal direction L and the ejection direction E deviates from 90° typically not more than 15°, preferably not more than 10° and particular preferably not more than 5°.

Figure 3:
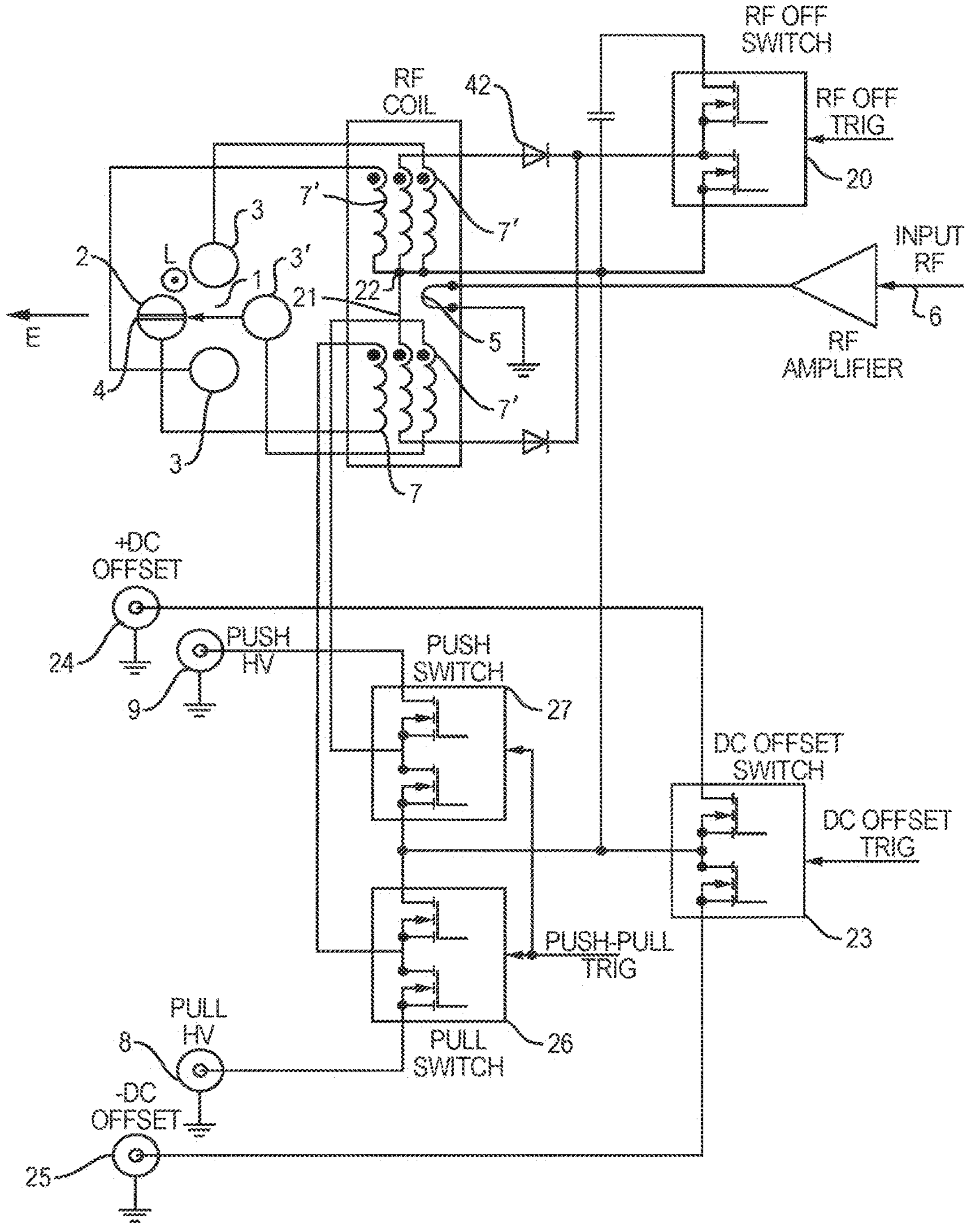
FIG. 3 shows more detailed electrical circuit of the voltage supply of another ion trap according to the prior art, which is a linear ion trap.

FIG. 3 shows in more detail an electrical circuit of the voltage supply of the ion trap 1 according to the prior art disclosed in US 2011/0315873 A1. In this Figure is the voltage supply for a linear ion trap shown.

It is shown the ejection of ions stored in the ion trap 1 in ejection direction E. The ion trap is comprising an ejection electrode 2 and the further electrodes 3, 3'. To facilitate ejection, a opening 4 is provided in the ejection electrode 2.

A RF power supply 6 is shown which is connected with a primary winding 5. Further three pairs of symmetrical secondary windings 7,7' are shown, which are coupled with the primary winding 5. A RF switch 20 is shown to switch off the RF power supplied to secondary windings explained below. A first pair of secondary symmetrical windings 21 is shown which are connected to the full-wave rectifier 42 to rapidly reduce the RF voltage in the further secondary winding after the switch of the supplied RF voltage.

A first and a second winding 7' of a second pair of secondary windings supplies the further electrodes 3, of the ion trap, which are above the middle and at the right side of the ion trap 1. A first winding 7' of a third pair of secondary windings supplies the other further electrode 3 of the ion trap below the middle of the ion trap. The second winding 7 of a third pair of secondary windings supplies the other ejection electrode 2 of the ion trap. As can be seen from FIG. 3, all of the first windings of the first, second and third pair of secondary windings are connected together at the central tap 22 of the first pair of windings. However, only the second winding of the first pair is also connected to the central tap 22. The ends of the second of the windings 7' and 7 of the second and third pairs of secondary windings close to the central tap 22 are instead connected to a DC offset supply.

With the circuit shown in FIG. 3, positive or negative offsets (depending on the polarity of the ions trapped in the ion trap) can be set from DC voltage supplies 24, 25 that are selectable through a DC offset switch 23. However, rather than simply supply these selected DC offset voltages directly to secondary windings 7,7', they are routed through further high voltage supply switches 26 and 27. These switches 26 and 27 that preferably have low internal resistance may be set such that the DC offsets are delivered direct to the secondary windings 7,7'. In an alternative configuration, the switches may be set so that independent HV offsets can be applied to the two secondary windings 7, 7' respectively supplying the ejection electrode 2 and the right further electrode 3. In the case of positive ions in the ion trap, a DC push voltage supply 9 supplies a large positive voltage through push switch 27 that can be set on secondary winding 7' thereby applying a large positive potential to the right further electrode 3. This large positive potential repels ions stored in the ion trap towards the aperture 4 provided in opposite ejection electrode 2. A corresponding pull DC voltage supply 8 supplies a large negative potential through pull switch 8 and onto secondary winding 7, thereby applying a large negative potential on the ejection electrode 2 that will attract ions towards its opening 4. Accordingly, this arrangement allows either a small DC offset to be applied to the electrodes 2 and 3 that may be used, for example, to provide a potential well for trapping ions within the ion trap. This potential may even, for example, be supplied at the same time as the RF potential being supplied to the electrodes 2 and 3. When the RF potential is switched off using switch 20, ions may be ejected orthogonally from the ion trap by applying the DC push voltage supply 9 and pull DC voltage supply 8 to the right further electrode 3 and the ejection electrode 2 respectively in addition to applying the DC offset voltage from 24 or 25 to all of the electrodes.

Figure 4:
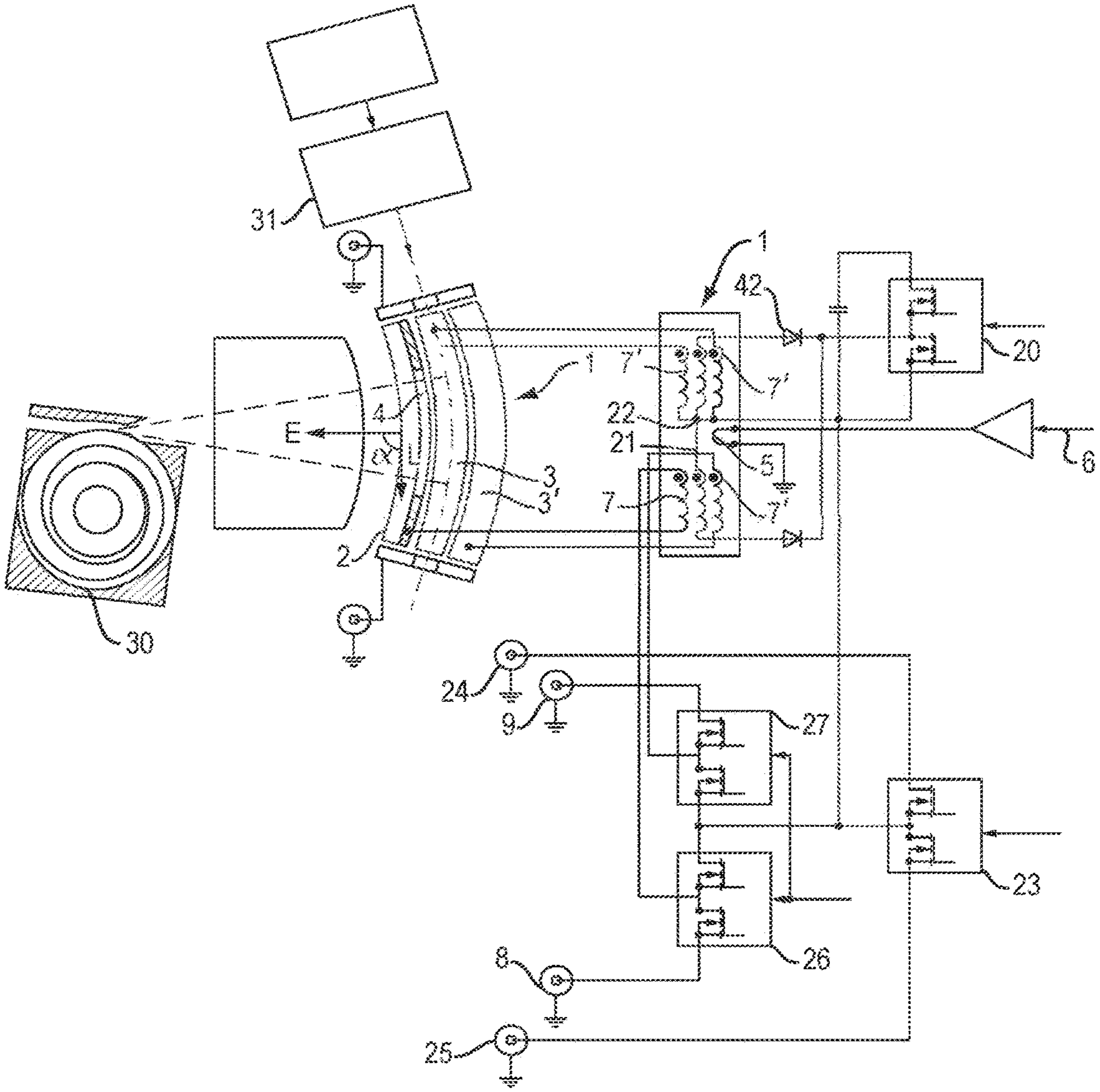
FIG. 4 shows more detailed electrical circuit of the voltage supply of another ion trap according to the prior art, which is a curved ion trap.

FIG. 4. shows detailed electrical circuit of the voltage supply of a curved ion trap 1 (C-trap) according to the prior art. The electrical circuit for providing the RF voltages and DC voltages is essentially the same as shown in FIG. 3. The ions are now supplied to the C-trap 1 by a transport multipole 31 to which ions are supplied from an ion source (not shown). The C-trap 1 ejects the trapped ions through the opening 4 of the ejection electrode 2 into an Orbitrap® mass analyser.

Figure 5:
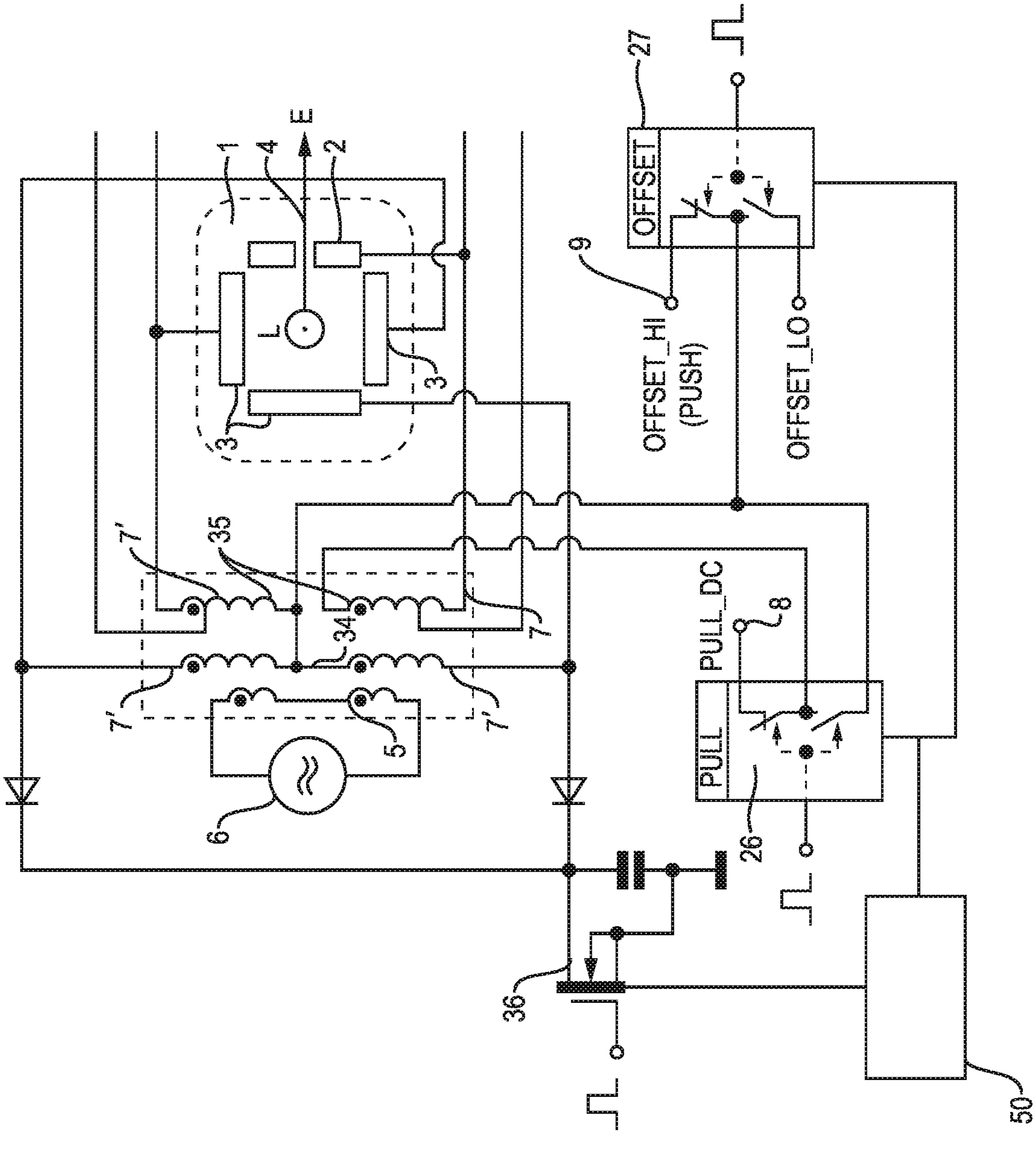
FIG. 5 shows detailed electrical circuit of the voltage supply of a first embodiment of an inventive ion trap.

FIG. 5 shows in detail an electrical circuit of the voltage supply of a first embodiment of an inventive ion trap 1. The ion trap 1 has elongated electrodes 2,3 in a longitudinal direction L and can be a linear ion trap or a curved ion trap. A cross section of the ion trap 1 perpendicular to the longitudinal direction L is shown. The ion trap is comprising an ejection electrode 2 and three further electrodes 3. The ejection electrode 2 has an opening 4 through which ions stored in the ion trap 1 can be ejected in an ejection direction E.

In this drawing further is shown the RF voltage supply to the electrodes 2,3 when ions are being trapped and the DC voltage supply to the electrodes 2,3 of the ion trap when ions are being ejected.

Normally at least an RF voltage of two opposite phases is applied to the four electrodes 2,3 of the ion trap, when ions are trapped. It is further possible to apply a small DC voltage to at least one of the electrodes 2,3 of the ion trap to improve the trapping by potential wells (supplied as the LO OFFSET voltage from supply 9).

An RF generator is shown as RF power supply 6, which is connected with a primary winding 5 of a transformer. This primary winding 5 in the transformer arrangement is coupled with two pairs of secondary windings 34, 35. The first pair of secondary windings 34 is supplying via the two windings 7' a transformed RF voltage to the lower further electrode 3 and the left further electrode 3 arranged in the ion trap 1 opposite to the ejection electrode 2. The second pair of secondary windings 35 is supplying via the winding 7 a transformed RF voltage to the ejection electrode 2 and via the winding 7' a transformed RF voltage to the upper further electrode 3. Further a low offset DC voltage is optionally applied to all electrodes 2, 3 when ions are trapped in the ion trap. In this situation a pull switch 26 is opened (lower switch position) and a push (offset) switch 27 is switched on to provide the low offset voltage (OFFSET_LO).

When the controller 50 of the ion trap is switching the voltage supply of the ion trap 1 to eject ions, the control is switching the RF switch 36, the pull switch 26 and the push switch 27. At first the RF switch 36 is activated so as to switch off the RF voltage supplied to all electrodes 2, 3 of the ion trap. Then with a very short delay of 0-1000 ns the push switch 27 is activated so as to provide a second DC voltage, a high push voltage (OFFSET_HI) to the further electrodes 3 and the ejection electrode 2 via the opened pull switch 26. The value of the push voltage is typically between 1,500 and 2,500 V, preferably between 1,800 V and 2,200 V. Then with a very short delay of 0-1000 ns the pull switch 26 is activated (upper switch position) so as to provide a first DC voltage (PULL_DC) to the ejection electrode 2 in addition to the high push voltage. Due to this DC voltage supply the ions in the ion trap 1 are ejected through the opening 4 of the ejection electrode. More details about the ion ejection are explained in FIG. 6.

Figure 6:
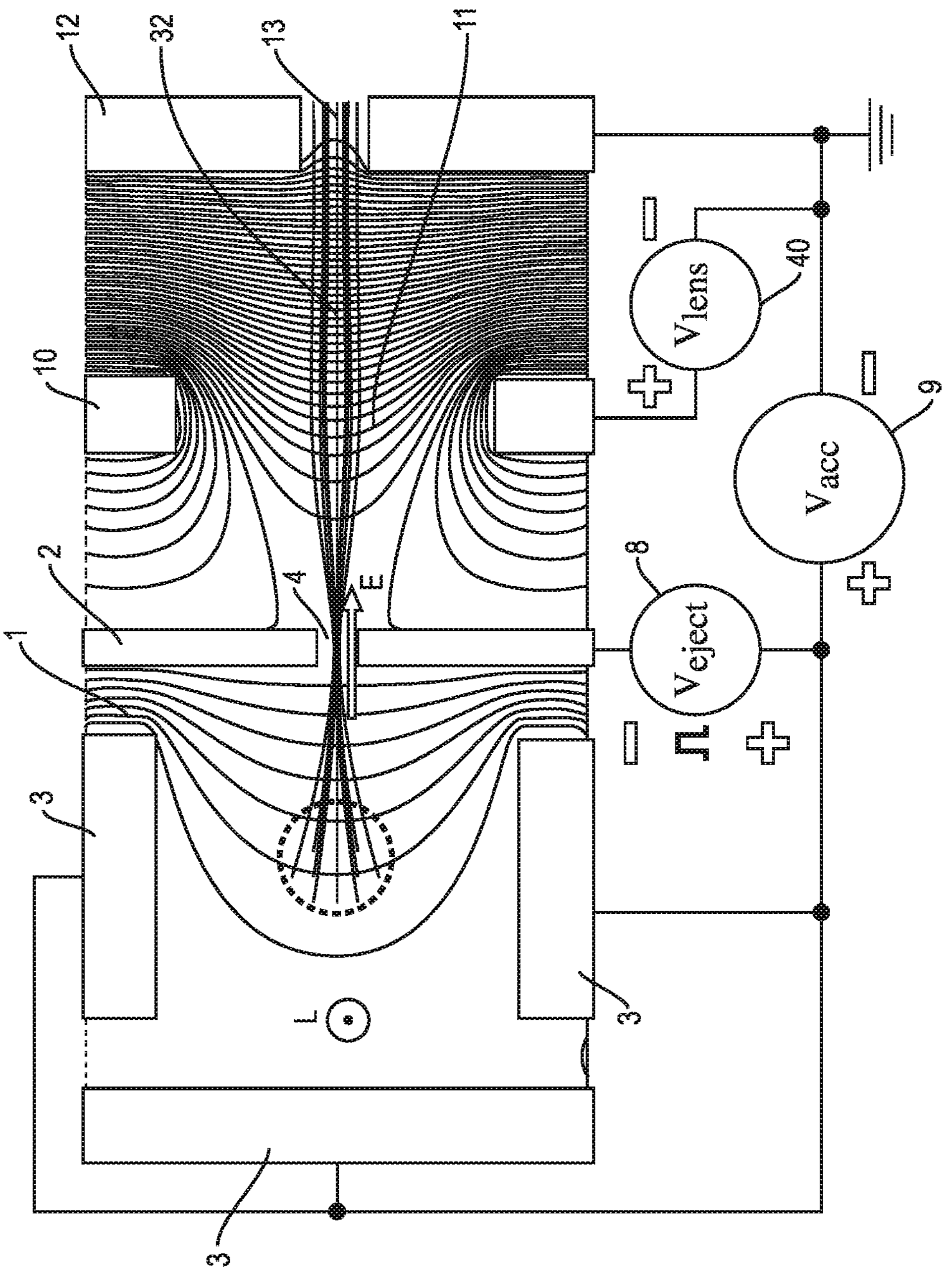
FIG. 6 shows the ejection of ions from a second embodiment of an inventive ion trap.

FIG. 6 shows the ejection of ions from a second embodiment of an inventive ion trap 1. The ion trap has elongated electrodes 2, 3 in the longitudinal direction L. A cross section of the ion trap perpendicular to the longitudinal direction L is shown. The ion trap comprises an ejection electrode 2 and three further electrodes 3. The ejection electrode 2 has an opening 4 through which ions stored in the ion trap 1 can be ejected in an ejection direction E. In this drawing further is shown the DC voltage supply to the electrodes of the ion trap when ions are ejected. The ejected ions are accelerated to an acceleration lens 12 having an opening 13. Further is shown a focusing lens 10 with an opening 11, which is arranged between the opening of the ejection electrode 2 and the acceleration lens 12. Ejection electrode 2, focusing lens 10 and acceleration lens 12 are arranged along the ejection direction E, wherein ejected ions first pass the opening 4 of the ejection electrode 2, then the opening 11 of the focusing lens 10 and finally the opening 13 of the acceleration lens 12.

Normally at least an RF voltage is applied to the four electrodes 2,3 of the ion trap, when ions are trapped, for example in the manner shown in FIG. 5. It is further possible to apply a small DC voltage to at least one of the electrodes 2,3 of the ion trap to improve the trapping by potential wells.

When the trapped ions are to be ejected, the RF voltage and if present also the small DC voltage is switched off. Then a second DC voltage $V_{acc}$ is applied via second DC supply 9 which is connected with the three further electrode 3 and the acceleration lens 12, which is grounded. The three further electrode 3 are connected with the second DC supply 9 via secondary windings 7' of a transformer supplying the RF voltage to the three further electrodes 3. A typical value for the applied second voltage is 2,000 V. The second DC supply 9 is also connected to the ejection electrode 2 via a first DC supply 8, whereby a first DC voltage $V_{eject}$ is applied to ejection electrode 2. This first DC voltage $V_{eject}$ is applied between the further electrodes 3 and the ejection electrode 2 by the first DC supply 8. A typical value for the first DC voltage $V_{eject}$ is 300V, wherein the negative polarity is applied to the ejection electrode 2. Due to this, relative to ground, a voltage of 1,700 V is applied to the ejection electrode 2. When these voltages are applied to the electrodes 2,3 of the ion trap, positively charged ions are pushed by the voltage applied to the further electrodes 3 in direction of the ejection electrode 2 and pulled by the voltage applied to the ejection electrode 2 to the ejection electrode 2. This effect on the positively charged ions is created by the electric field in the ion trap, which is provided by the voltage difference between the further electrode 3 and the ejection electrode 2. This electric field has in particular an improved component directed to the ejection electrode 2 and in particular an improved component directed to the opening 4 of the ejection electrode 2. Providing only the ejection electrode 2 with a different voltage to the further electrodes 3 creates a more non-uniform electric field than in the prior art. Thus by the curcature of the equi-potentials of this electric field, stronger focusing of ions through the opening 4 of the ejection electrode 2 may be achieved. Such non-uniformity of the electric field within the volume of the ion trap creates a converging lens that may bring ions from a wide region (dashed circle) through the narrow ejection opening 4. Thus, advantages are that a higher amount of ions may be extracted from a region substantially wider that the ejection opening and contamination of the ejection electrode around the opening may be reduced. Accordingly, as shown in the Figure, the ion beam 32 of the ions in the ion trap is directed to the middle of opening 4 of the ejection electrode 2. At least nearly all ions are passing the opening 4 and are further accelerated by the grounded acceleration lens 12. In the inventive ion trap 1, preferably ions do not strike the edge of the opening 4 or only a small portion of ions do so. This leads to an improved efficiency of the ion ejection: a contamination of the ejection electrode 2 at the edge of its opening 4 can be avoided. Further the dotted circle shows the region from which ions are ejected from the ion trap 1, when the DC voltage is applied as described before. In comparison to FIG. 1 the diameter of the circle is bigger and therefore ions of a larger region in the ion trap are ejected by the inventive ion trap. Further is shown that the ion beam 32 leaving the opening 4 is strongly diverging. To reduce this the focusing lens is positioned between the ejection electrode 2 and the acceleration lens 12. The focusing lens 10 has a wide opening 11 with a diameter larger than the opening 13 of the acceleration lens 12 and larger than the opening 4. Typically, voltages $V_{lens}$ between 800 V and 5,000 V are applied to the focusing lens 10 by a third DC voltage supply 40, wherein this voltage is applied between the focusing lens 10 and the grounded acceleration lens 12. In the shown embodiment a voltages $V_{lens}$ of 2,400 V is applied. Preferably the voltages $V_{lens}$ is between 1,500 V and 3,500 V. By the application of the voltage $V_{lens}$ to the focusing lens a collinear ion beam 32 of the ejected ions can be formed.

Figure 7:
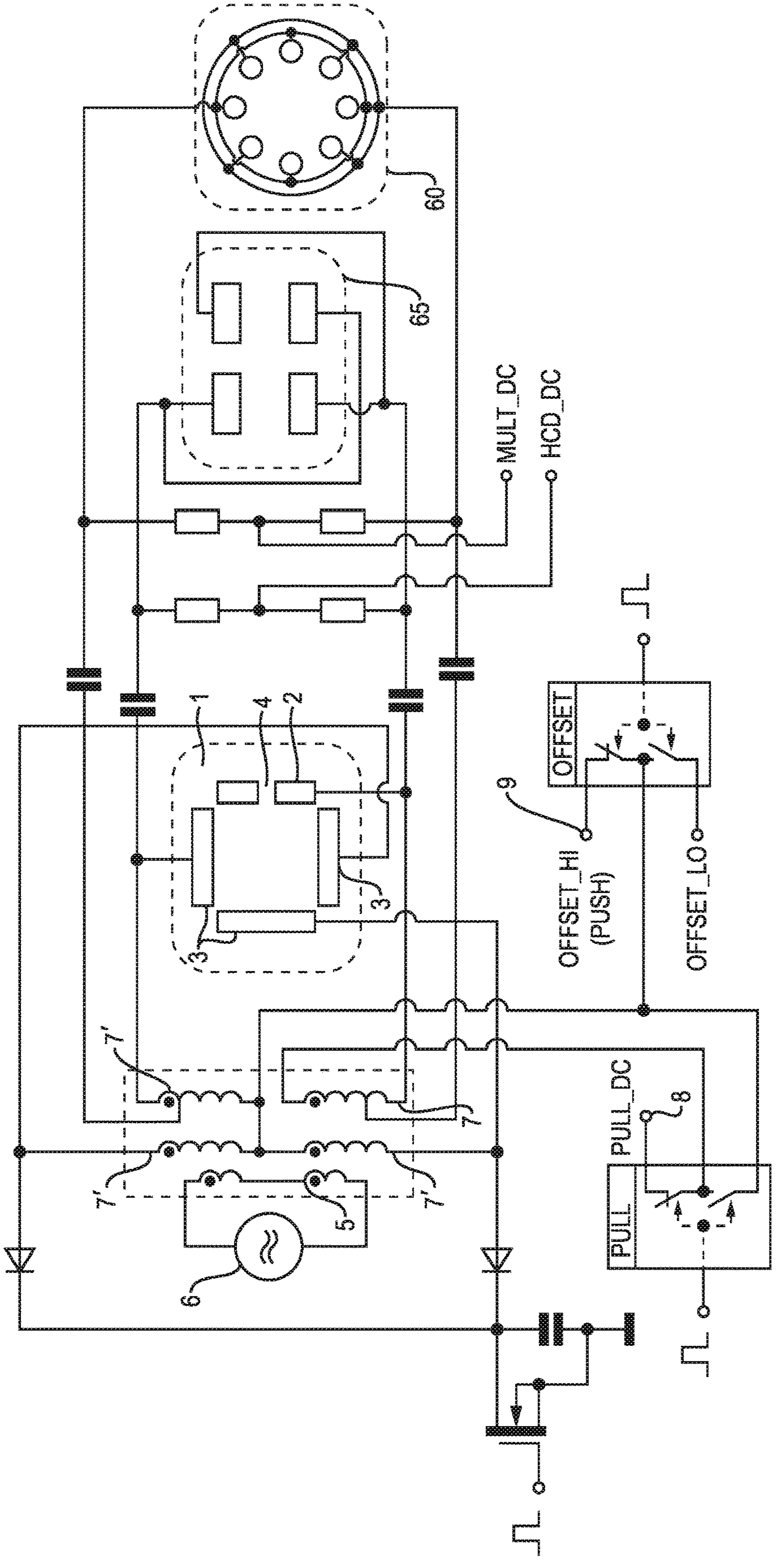
FIG. 7 shows the detailed electrical circuit of the voltage supply of a first embodiment of an inventive ion trap shown in FIG. 5 including also an RF voltage supply for HCD cell and transport multipole.

FIG. 7 shows the detailed electric circuit of voltage supply shown in FIG. 5 wherein further RF voltages are tapped from the RF voltage supply to provide RF voltages to further components of a mass spectrometer, in this embodiment a transport multipole and a HCD cell. Still other components of a mass spectrometer can be supplied in the same way with a RF voltage. The common supply of the electrodes of the ion trap and other components has the advantage to reduce the number of RF sources and avoid synchronisation problems between the ion trap and other components which are influencing the performance of mass spectrometer. Several of the processes of the inventive method can be supported or implemented using one or more computers and processors, being stand alone or connected or in a cloud system, and by software to execute the processes.

The embodiments described in this application represent examples of the inventive ion traps and inventive methods. Accordingly, the invention can be realised by each embodiment alone or by a combination of several or all features of the described embodiments without any limitations.

The invention claimed is:

1. An ion trap comprising:

a plurality of electrodes for ion trapping, the plurality of electrodes including an ejection electrode having an opening through which ions in the ion trap can be ejected in an ejection direction E and a plurality of further electrodes;

a primary winding connected to an RF power supply;

a secondary winding coupling with the primary winding for transforming RF voltage of the RF power supply to generate a first transformed RF voltage and supplying the first transformed RF voltage to the ejection electrode;

a secondary windings group coupling with the primary winding for transforming the RF voltage of the RF power supply to generate a second transformed RF voltage and supplying the second transformed RF voltage to the plurality of further electrodes;

a first DC supply;

a second DC supply; and a controller, wherein the ejection electrode and the plurality of further electrodes are elongated in a longitudinal direction L, an angle $\alpha$ between the longitudinal direction L and the ejection direction E deviates from 90° not more than 15°, the controller is configured for applying in a time period a first DC voltage provided by the first DC supply via the secondary winding to the ejection electrode to pull ions in the ion trap to the opening of the ejection electrode and, during the time period, also applying a second DC voltage provided by the second DC supply via the secondary windings group to at least 70% of the plurality of further electrodes to push ions in the ion trap to the opening of the ejection electrode.

2. The ion trap according to claim 1, wherein the controller is applying in the time period the second DC voltage provided by the second DC supply via the secondary windings to at least 80% of the plurality of further electrodes to push ions in the ion trap to the opening of the ejection electrode.

3. The ion trap according to claim 2, wherein the controller is applying in the time period the second DC voltage provided by the second DC supply via the secondary windings to all of the plurality of further electrodes to push ions in the ion trap to the opening of the ejection electrode.

4. The ion trap according to claim 1, wherein the controller is applying at a same time the first DC voltage provided by the first DC supply via the secondary winding to the ejection electrode to pull ions in the ion trap to the opening of the ejection electrode and the second DC voltage provided by the second DC supply via the secondary windings to the at least 70% of the plurality of further electrodes to push ions in the ion trap to the opening of the ejection electrode.

5. The ion trap according to claim 1, wherein a voltage difference between the first DC voltage applied to the ejection electrode and the second DC voltage applied to the plurality of further electrodes is between 50 V and 800 V.

6. The ion trap according to claim 1, wherein the ion trap is comprising a focusing lens, which is arranged for the ejected ions downstream of the of the opening of the ejection electrode and is focusing the ejected ions.

7. The ion trap according to claim 6, wherein the focusing lens has an opening into which the ejected ions are directed which is larger than the opening of the ejection electrode.

8. The ion trap according to claim 6, wherein the focusing lens is an electrostatic lens to which a DC voltage is applied, so that a voltage difference between the DC voltage of the focusing lens and the first DC voltage of the ejection electrode is between 250 V and 1,500 V.

9. The ion trap according to claim 6, wherein the focusing lens is an electrostatic lens to which a DC voltage is applied and a ratio of a voltage difference between the DC voltage of the focusing lens and the first DC voltage of the ejection electrode and a voltage difference between the DC voltage applied to the ejection electrode and the DC voltage applied to the plurality of further electrodes is between 1.5 and 6 V.

10. The ion trap according to claim 6, wherein the ion trap is comprising an acceleration lens is arranged for the ejected ions downstream of the focusing lens.

11. The ion trap according to claim 10, wherein the acceleration lens has an opening into which the ejected ions are directed, the opening of the acceleration lens being smaller than the opening of focusing lens.

12. The ion trap according to claim 10, wherein the acceleration lens is an electrostatic lens to which a DC voltage is applied, so that a voltage difference between the DC voltage of the acceleration lens and the DC voltage of the focusing lens is between 800 V and 5,000 V.

13. The ion trap according to claim 10, wherein the acceleration lens is an electrostatic lens to which a DC voltage is applied, and a ratio of a voltage difference between the voltage difference between the DC voltage of the acceleration lens and the first DC voltage of the ejection electrode and a voltage difference between the first DC voltage applied to the ejection electrode and the second DC voltage applied to the plurality of further electrodes is between 2 and 12.

14. The ion trap according to claim 10, wherein the acceleration lens is an electrostatic lens to which a DC voltage is applied, and a ratio of a voltage difference between the first DC voltage applied to the ejection electrode and the second DC voltage applied to the plurality of further electrodes and a voltage difference between the voltage difference between the DC voltage of the acceleration lens and the second DC voltage applied to the plurality of further electrodes and is between 0.05 and 0.4.

15. Software configured to be executed by a processor to cause performance of a method of ejecting ions from an ion trap, which is comprising a plurality of electrodes for ion trapping, the plurality of electrodes comprising an ejection electrode and a plurality of further electrodes elongated in a longitudinal direction L for ion trapping, wherein the ejection electrode comprises an opening through which ions in the ion trap can be ejected in an ejection direction E, wherein an angle α between the longitudinal direction L and the ejection direction E deviates from 90° not more than 15°, wherein RF voltage is supplied to the ion trap by a primary winding connected to an RF power supply, a secondary winding coupling with the primary winding transforming the RF voltage of the RF power supply and supplying the transformed RF voltages to the ejection electrode and a secondary windings group coupling with the primary winding transforming the RF voltage of the RF power supply and supplying the transformed RF voltages to the further electrodes, a first DC supply and a second DC supply, the method comprising:

switching off the RF voltage supplied to the ejection electrode and the plurality of further electrodes of the ion trap; and applying in a time period a first DC voltage via the secondary winding provided by the first DC supply to the ejection electrode to pull ions in the ion trap to the opening of the ejection electrode and, during the time period, also applying a second DC voltage provided by the second DC supply via the secondary windings group to at least 70% of the plurality of further electrodes to push ions in the ion trap to the opening of the ejection electrode.

* * * * *